(12) United States Patent
Jones (10) Patent No.: US 7,216,596 B2
(45) Date of Patent: May 15, 2007

(54) AGRICULTURAL APPARATUS

(75) Inventor: Christopher Anthony Jones, New South Wales (AU)

(73) Assignee: Ceekay Innovations Pty Ltd, Condobolin (AU)

(*) Notice: Subject to any disclaimer, the term of this patent is extended or adjusted under 35 U.S.C. 154(b) by 0 days.

(21) Appl. No.: 11/451,628

(22) Filed: Jun. 12, 2006

(65) Prior Publication Data

US 2006/0288921 A1    Dec. 28, 2006

Related U.S. Application Data

(63) Continuation-in-part of application No. 10/220,673, filed on Oct. 23, 2002, now Pat. No. 7,104,206.

(30) Foreign Application Priority Data

Jun. 28, 2005    (AU)    ............... 2005202826

(51) Int. Cl.
*A01C 5/00*    (2006.01)
(52) U.S. Cl. ............... 111/164; 111/167; 111/194; 172/574; 172/701
(58) Field of Classification Search ........ 172/574–576, 172/579, 603, 604, 170, 172, 701; 111/149, 111/163, 164, 191, 167–169, 194, 139, 140
See application file for complete search history.

(56) References Cited

U.S. PATENT DOCUMENTS 33,103 A    8/1861    Pond (Continued)

FOREIGN PATENT DOCUMENTS

| AU | 7568781 | 4/1982 |
|---|---|---|
| AU | 3443795 | 8/1996 |
| EP | 0406939 | 1/1991 |
| EP | 0540995 | 5/1993 |
| EP | 0772963 | 5/1997 |
| GB | 1 601 779 | 11/1981 |
| WO | 95/09524 | 4/1995 |
| WO | 9509524 | 4/1995 |

*Primary Examiner*—Christopher J. Novosad
(74) *Attorney, Agent, or Firm*—Ladas and Parry LLP (57) ABSTRACT

An agricultural plough (1) including a longitudinally extending support member (2) having a forward portion to be attached to a vehicle to thereby enable the apparatus (1) to be towed by the vehicle; a generally "n" shaped frame (500) fixed to the support member (2) and including a pair of ends (505, 510) located on opposite longitudinal sides and spaced normal to the support member (2); a pair of axles (13, 14) attached to and extending laterally from the ends and providing a pair of laterally extending rotational axes, the axes being located on opposite sides of the member (2) and in a plane extending transversely normal to the member (2) and at an acute angle longitudinally so as to extend rearwardly down, the axes each being inclined by an acute angle of 6 to 12 degrees to a plane extending normal to the member (2) to diverge rearwardly; a plough disc (18, 20) supported on each axle to rotate about the rotational axes, with the discs (18, 20) and axles being configured so that the discs (18, 20) converge rearwardly and downwardly, the discs (18, 20) being displaced rearwardly from the forward portion; a wheel attached to the support member (2) and rotatable about an axis generally transverse of the support member (2), the wheel (12) being located rearwardly of the axles (13, 14); and structure connected to the support member (2) and to be attached to the vehicle, to urge the member downwardly so that the discs (18, 20) are urged into soil and the wheel (12) is urged into contact with a soil surface rearwardly of the discs (18, 20) so that upon forward movement of the vehicle with the discs (18, 20) engaged in the soil, each disc (18, 20) forms a separate groove and a corresponding ridge in the soil between the grooves, with the ridge being engaged by the wheel (12) to urge the soil to cover seeds located in the grooves.

11 Claims, 10 Drawing Sheets

U.S. PATENT DOCUMENTS

| | | |
|---|---|---|
| 2,691,353 A | 10/1954 | Mateo |
| 2,734,439 A | 2/1956 | Padrick |
| 3,951,306 A | 4/1976 | Ernst |
| 4,141,302 A | 2/1979 | Morrison, Jr. et al. |
| 4,196,679 A | 4/1980 | Moore |
| 4,273,057 A | 6/1981 | Pollard |
| 4,275,670 A | 6/1981 | Dreyer |
| 4,289,081 A | 9/1981 | Koronka |
| 4,307,674 A | 12/1981 | Jennings et al. |
| 4,596,200 A | 6/1986 | Gafford et al. |
| 4,825,783 A | 5/1989 | Moore |
| 4,893,572 A | 1/1990 | Schaefer |
| 4,920,901 A | 5/1990 | Pounds |
| 4,930,431 A | 6/1990 | Alexander |
| 4,964,351 A | 10/1990 | Elmenhorst |
| 5,082,063 A | 1/1992 | Sidders |
| 5,398,625 A | 3/1995 | Johnson et al. |
| 5,477,792 A | 12/1995 | Bassett et al. |
| 5,595,130 A | 1/1997 | Baugher et al. |
| 5,724,902 A | 3/1998 | Janelle et al. |

AGRICULTURAL APPARATUS

This application is a continuation-in-part of application Ser. No. 10/220,673 filed on Oct. 23, 2002 now U.S. Pat. No. 7104206, claims the benefit thereof and incorporates the same by reference.

The present invention relates to an agricultural apparatus for use in the sowing of seeds. In particular, the invention relates to an agricultural plough having a disc planter.

BACKGROUND OF THE INVENTION

Conventional disc planters typically have a frame attachable to a towing vehicle. The frame usually comprises a pair of parallel support arms spaced vertically, one above the other. The arms are hingedly attached to a support plate or beam which is attached to the towing vehicle. A support fame is attached to the other ends of the arms to support the seed planting apparatus. A pair of discs are mounted on the support frame in addition to two press wheels which are spaced from and located behind the two discs. The discs are mounted on an axle to which is attached a disc lever to alter the lateral spacing of the discs relative to one another on the axle. Each pair of discs are arranged to cut a single furrow or groove in the soil into which the seed is deposited. Typically, a plurality of disc planters of the type described above are attached in parallel to the towing vehicle, the disc planters being spaced laterally from one another, to enable a number of rows of seeds to be sown simultaneously.

In operation, the plurality of disc planters are attached to the towing vehicle and the lateral spacing of the discs on the axles on which they are mounted is adjusted to suit the type of seed to be planted. The discs rotate about the axles to cut grooves in the soil as the towing vehicle is driven over the ground on which the seed is to be sown. The soil cut by the discs is typically thrown out in a sideways direction by the discs as it is cut, there being no actual control over the amount or direction of soil thrown. The seeds are dropped into the grooves made by the discs via grain tubes, the outlets of which are typically located between the discs and the press wheels. Once the seed has been dropped into the grooves, the press wheels push the soil into the grooves to cover the seeds. In some conventional embodiments a further wheel or wheels are located between the discs and the press wheels to cover the sown seeds before the soil is compacted further by the press wheels.

OBJECTS OF THE INVENTION

It is an object of the present invention to overcome or ameliorate some of the disadvantages of the prior art, or at least to provide a useful alternative.

SUMMARY OF THE INVENTION

According to the present invention there is preferably provided a plough including:

a longitudinally extending support member having a forward portion to be attached to a vehicle to thereby enable the apparatus to be towed by the vehicle;

a generally "n" shaped frame fixed to said support member and including a pair of ends located on opposite longitudinal sides and spaced normal to, said support member;

a pair of axles attached to and extending laterally from said ends and providing a pair of laterally extending rotational axes, the axes being located on opposite sides of the member and in a plane extending transversely normal to said member and at an acute angle longitudinally so as to extend rearwardly down, the axes each being inclined by an acute angle of 6 to 12 degrees to a plane extending normal to the member to diverge rearwardly;

a plough disc supported on each axle to rotate about said rotational axes, with the discs and axles being configured so that the discs converge rearwardly and downwardly, the discs being displaced rearwardly from said forward portion;

a wheel attached to said support member and rotatable about an axis generally transverse of the support member, the wheel being located rearwardly of said axles; and means connected to the support member and to be attached to the vehicle, to urge said member downwardly so that said discs are urged into soil and said wheel is urged into contact with a soil surface rearwardly of the discs so that upon forward movement of the vehicle with the discs engaged in the soil, each disc forms a separate groove and a corresponding ridge in the soil between said grooves, with the ridge being engaged by the wheel to urge the soil to cover seeds located in the grooves.

Preferably, the axes are inclined by an acute angle of 8 to 10 degrees.

Preferably, said support member may be comprised of a first member and a second member, said second member being attached to said first member, for example said second member being welded to said first member.

Preferably, said axles extend through said second member.

Preferably, said second member includes said frame.

Preferably, said wheel for pressing soil into the grooves may be mountable on said second member.

Preferably, said axles are rotatable with respect to said support member.

Preferably, the means for urging the discs into the soil is operable to enable adjustment of the depth of the grooves to be formed.

Preferably, means for urging the discs into the soil may comprise a hydraulic cylinder connectable between said vehicle and the support member.

Preferably, including locking means for locking said adjustment assembly in a preselected position thereby inhibiting movement of the axles relative to the support member.

Preferably, further comprising an adjustable assembly operatively associated with said axles to adjust the position of the axles relative to said support member and soil.

Preferably, the discs are outwardly inclined by an acute angle to a plane extending normal to the member.

BRIEF DESCRIPTION OF THE DRAWINGS

Various embodiments of the agricultural apparatus according to the invention will now be more fully described, by way of example only, with reference to the drawings in which.

DETAILED DESCRIPTION OF THE PREFERRED EMBODIMENTS

Figure 1:
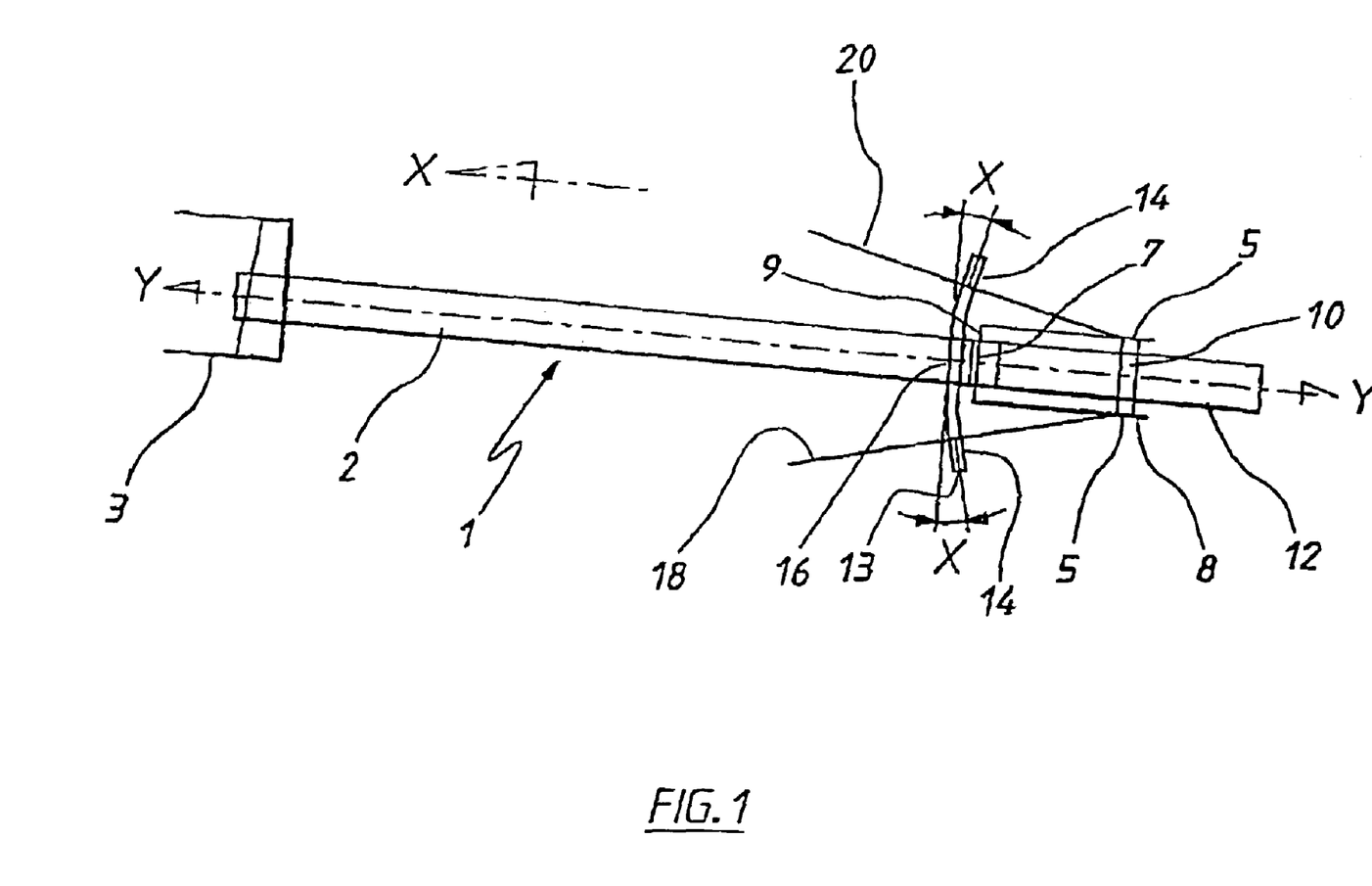
FIG. 1 is a schematic plan view of a disc planter.
Figure 2:
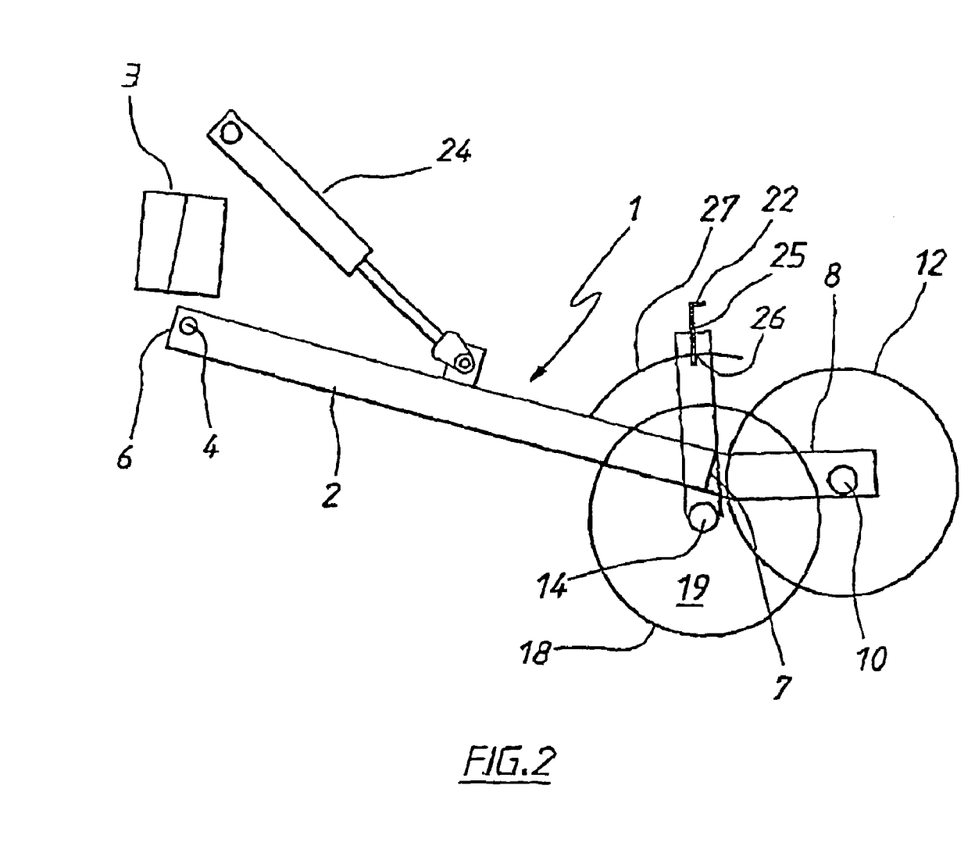
FIG. 2 is a schematic side elevation of the disc planter of FIG. 2.
Figure 3:
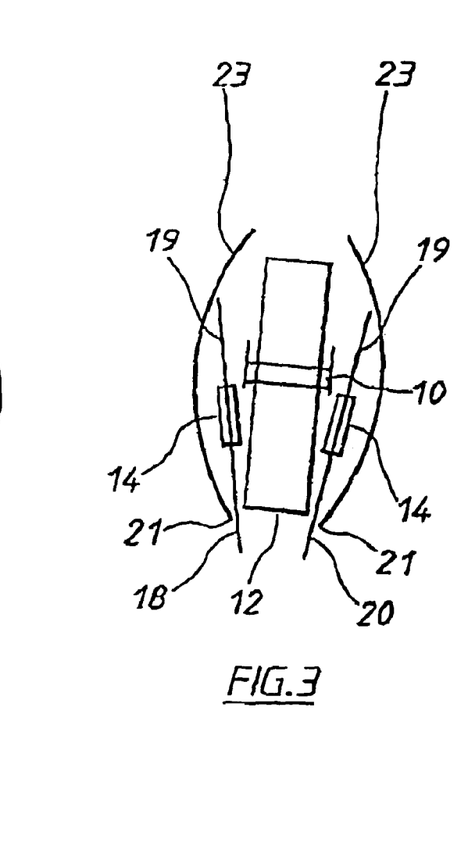
FIG. 3 is a schematic third angle projection of the disc planter of FIG. 1.

The disc planter 1 shown in FIGS. 1 to 3 has a longitudinally extending support member comprising a main beam or bar 2 which is pivotally attachable, by means of a hinge 4 located towards one free end 6 of the main beam 2, to a bar 3 attached to the seed dispensing apparatus or towing vehicle (not shown). Pivotally attached to the other end 7 of the main beam 2 is a U-shaped bracket 8. The base portion 9 of the U-shaped bracket 8 is adjacent the end 7 of the main beam 2 and the arms 5 of the U-shaped bracket 8 extend in a direction away from the main beam 2. A first axle 10 extends through an aperture in each of the arms 5 of the U-shaped bracket 8 towards the free ends thereof in a plane parallel to the base portion 9 of the U-shaped bracket. A press wheel 12 is rotatably located on the first axle 10. The first axle 10 extends through a central aperture in the press wheel 12 such that the press wheel 12 is partially located in the cavity defined by the base and arm portions of the U-shaped bracket 8, as shown in FIG. 1.

A second axle 13 extends through an aperture in the main beam 2 at a position adjacent the base section 9 of the U-shaped bracket 8. The second axle 13 is comprised of a central portion 16 and two arm portions 14. The arm portions 14 forming a pair of axles and being angled with respect to the central portion 16 and extending one from each end of the central portion 16. As shown in FIG. 1, the axes being located on opposite sides of the member and in a plane extending transversely normal to said member and at an acute angle longitudinally so as to extend rearwardly down, the axes each being inclined by an acute angle X of 6 to 12 degrees to a plane extending normal to the member and preferably, 8 to 10 degrees. The central longitudinal axes of the arm portions 14 and the central portion 16 lie in a common plane so that the arm portions 14 are angled in the same plane.

Figure 11:
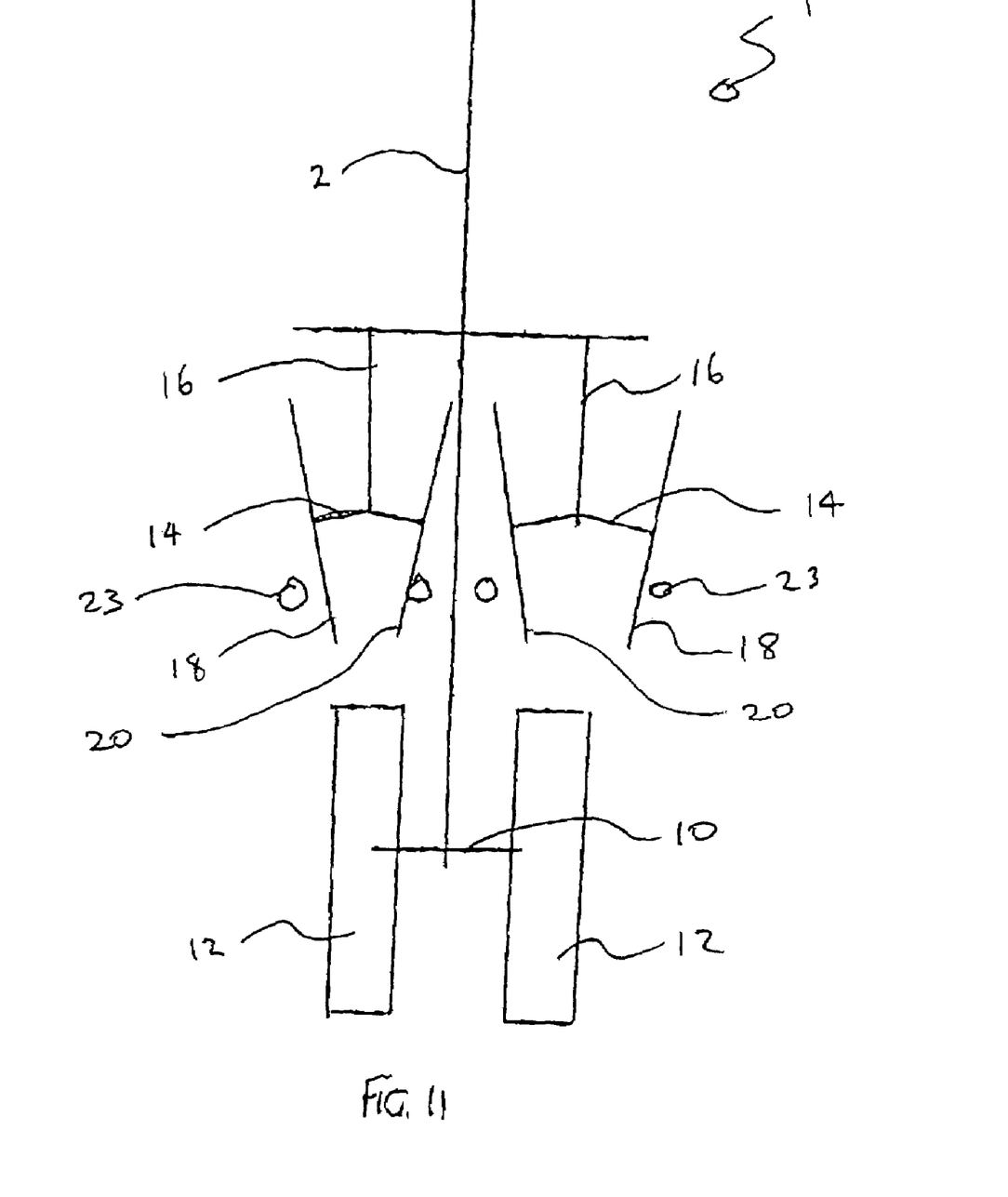
FIG. 11 is a schematic end elevation of two disc planters of FIGS. 1 to 3 connected together.

The second axles 13 may be rotatable in the aperture in the main beam 2 through which they extend. Two plough discs 18 and 20 are rotatably mounted to the angled portions 14 of the second axles 13, the angled portions 14 of the second axles 13 extending through a central aperture in each of the discs 18 and 20. The discs 18 and 20 are arranged in planes which converge rearwardly in relation to the direction of travel Z and downwardly in relation to the main beam 2. The discs being displaced rearwardly from said vehicle. This has the advantage that little or no soil is thrown around during the cutting of the grooves/furrows. Also, any soil which is thrown up during the formation of the grooves in the soil is thrown by each disc 18 and 20 towards the central longitudinal plane Y of the main beam 2 rather than outwardly away from the outer surfaces 19 of the discs. This is particularly advantageous as the soil surface ends up reasonably flat and the seeds are able to be placed accurately in the desired location in the soil. Also, it enables the apparatus to be used at higher driving speeds, for example at 25 to 30 kilometres per hour. The press wheel 12 presses the soil into place shortly after the grooves/furrows have been cut and the seeds sown, which also enables the apparatus to be used at higher speeds. As shown in FIG. 11, two or more disc planters 1 can be connected together and towed by a vehicle.

As shown in FIG. 2, an adjustment assembly in the form of a lever 22 is attached to the second axles 13, for example by welding. The lever 22 is adjustable by location of a lever pin 25 in one of a number of apertures 26 in an arcuate plane 27 attached to the main beam 2, to permit alteration of the rotational position of the second axles 13 and therefore the position of the angled arm portions 14 relative to the ground. This enables selection and variation of the angle of the discs 18 and 20 attached to the arm portions 14 relative to the ground, to suit the type of seed to be sown. The lever 22 is also used to lock the second axles 13 in the desired position. A pair of seed tubes 23 are each attached at one end to a seed container (not shown) and have a seed dispensing outlet end 21 located adjacent the outer face of each disc 18 and 20 at a position between the second axles 13 and the periphery of the discs 18 and 20 adjacent the press wheel 12. The angle of the seed tubes 23 in the vicinity of the outlet end 21 relative to the ground is adjustable, as is the position of the seed tubes 23 relative to the main beam 2. The closer back they are to the press wheel 12, the shallower the seeds may be sown, and the further away the seed tubes 23 are from the press wheel 12, the deeper the seeds may be sown.

Urging means in the form of a hydraulic cylinder 24 is fixed to the main body of the seed dispensing apparatus or towing vehicle (not shown), the hydraulic cylinder 24 being positioned such that it acts on the main beam 2 to exert a downward force on the main beam 2 to push the discs 18 and 20 into the ground during use.

In operation, a plurality of disc planters 1 are attached to the seed sowing apparatus/towing vehicle (not shown), the disc planters being spaced laterally from and parallel to one another across the rear of the towing vehicle. The adjustment means 22 is adjusted to select and set the position of the angled arm portions 14 relative to the ground which sets the spacing of the discs 18 and 20 fixed thereto to the ground and thus the width of the grooves to be made in the ground by the discs 18 and 20 to suit the type of seed to be sown. As the discs 18 and 20 are dragged through the soil by the seed sowing vehicle, the discs 18 and 20 rotate and leave grooves in the soil, the width and spacing of which will be set by the angle between the discs 18 and 20. Each disc 18 and 20 cuts a separate groove or furrow in the soil so that for each pair of discs 18, 20, two grooves or furrows are formed in the soil. The depth of the grooves made by the discs 18 and 20 is set by the pressure exerted on the main beam 2 by the hydraulic cylinder 24.

As the seed sowing vehicle moves over the ground and the discs 18 and 20 cause grooves to be made in the soil, the soil is pushed to form a ridge between the discs 18 and 20, the seed contained in the hopper (not shown) attached to the seed dispensing apparatus and towing vehicle is dropped into the grooves through seed tubes 23, and the soil is then pushed back by the press wheel 12 to press the soil firmly around the sown seeds to improve germination. As little or no soil is thrown around during the aforementioned process, the soil surface ends up reasonably flat and the seeds are able to be placed accurately in the desired location in the soil.

The disc planters shown in FIGS. 4 to 10 are modified versions of the disc planter 1 shown in FIGS. 1 to 3. Like reference numerals are used for the corresponding parts in the various embodiments.

Figure 4:
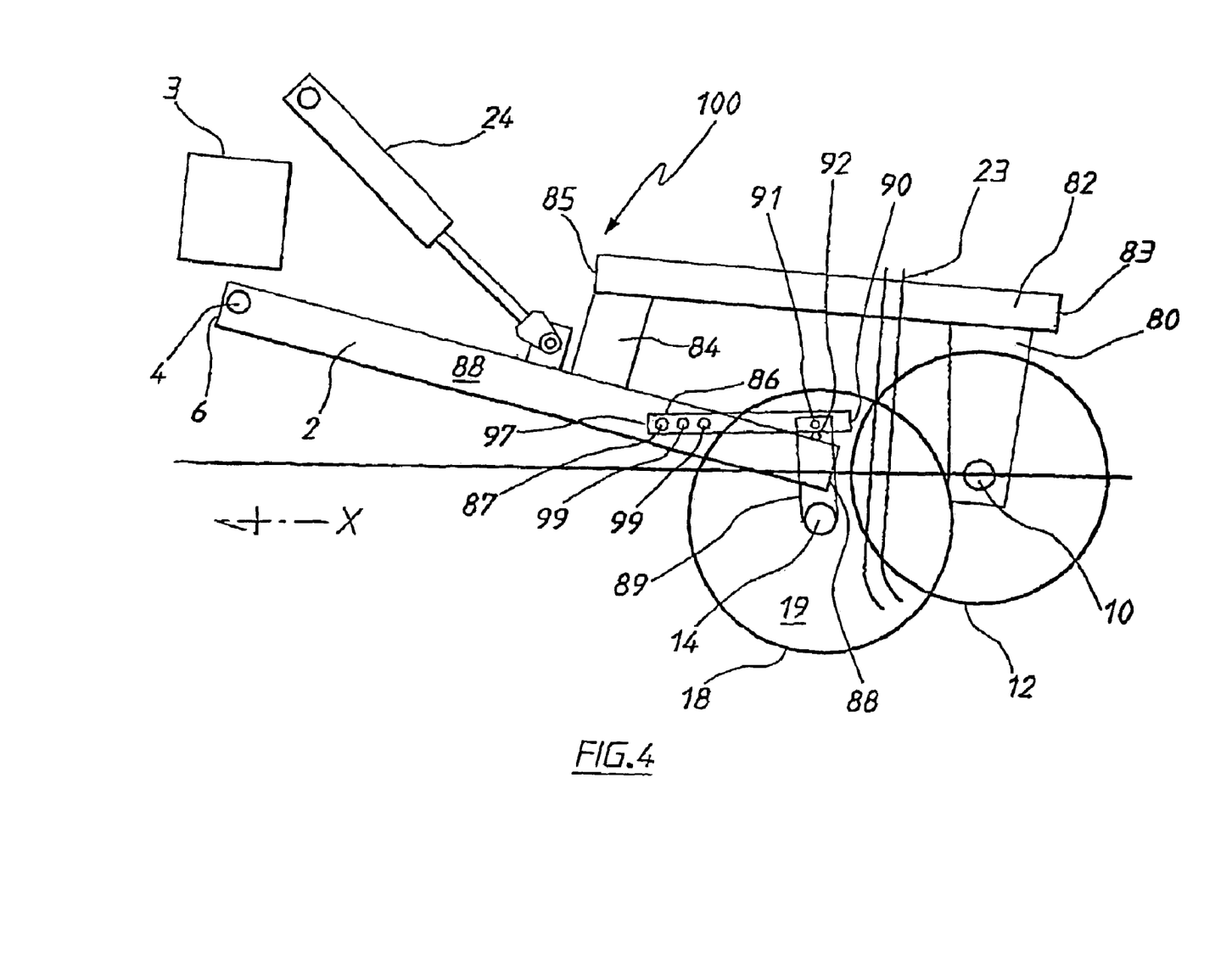
FIG. 4 is a schematic plan view of an alternative disc planter.
Figure 5:
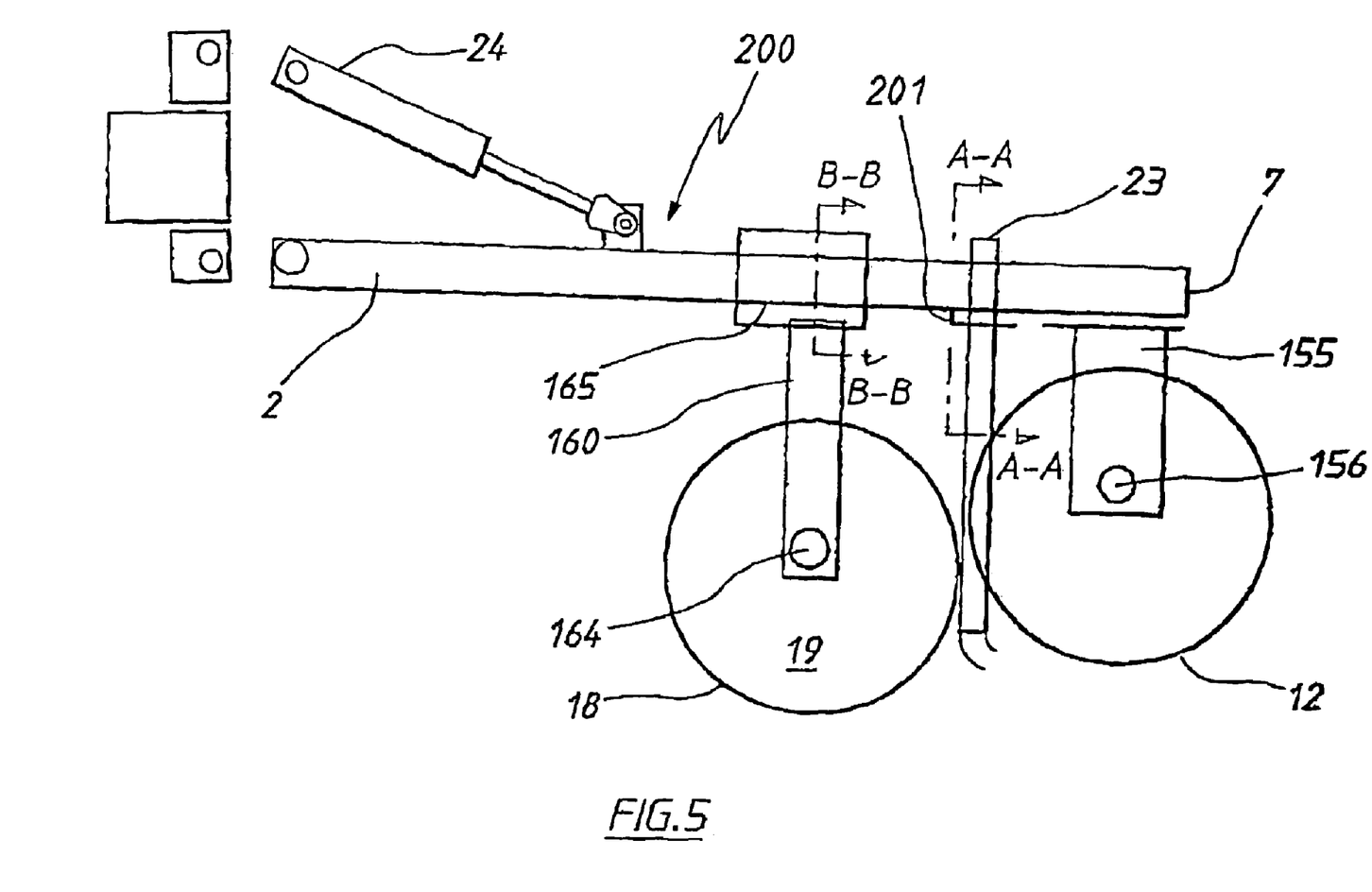
FIG. 5 is a schematic plan view of a further alternative disc planter.
Figure 6:
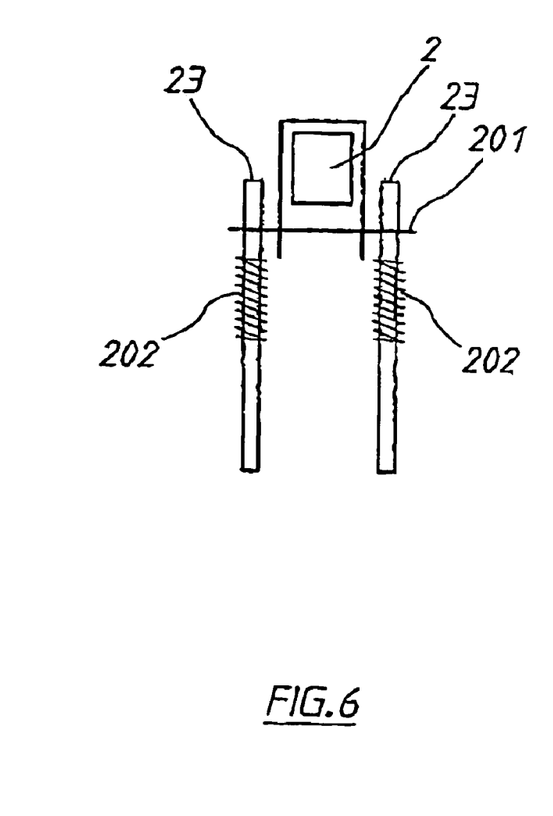
FIG. 6 is a schematic cross-sectional side elevation along the line A—A of the disc planter of FIG. 5.
Figure 7:
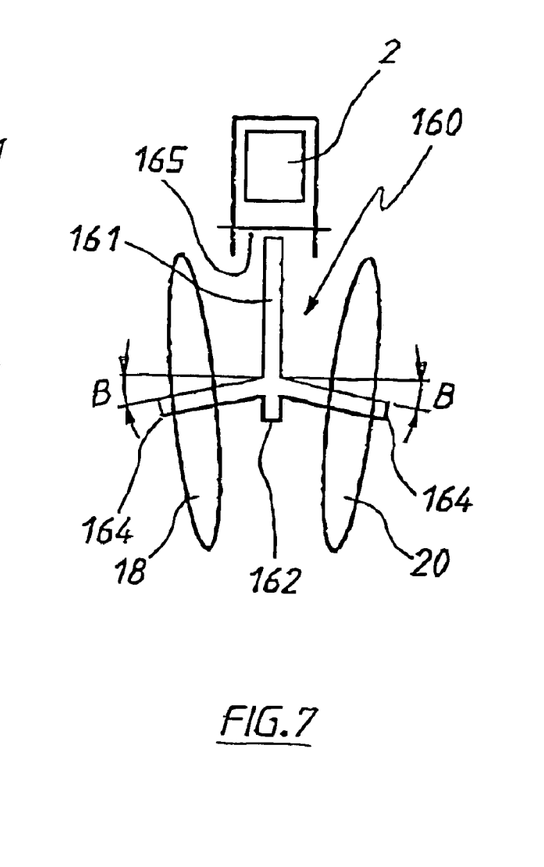
FIG. 7 is a schematic cross-sectional side elevation along the line B—B of the disc planter of FIG. 5.
Figure 8:
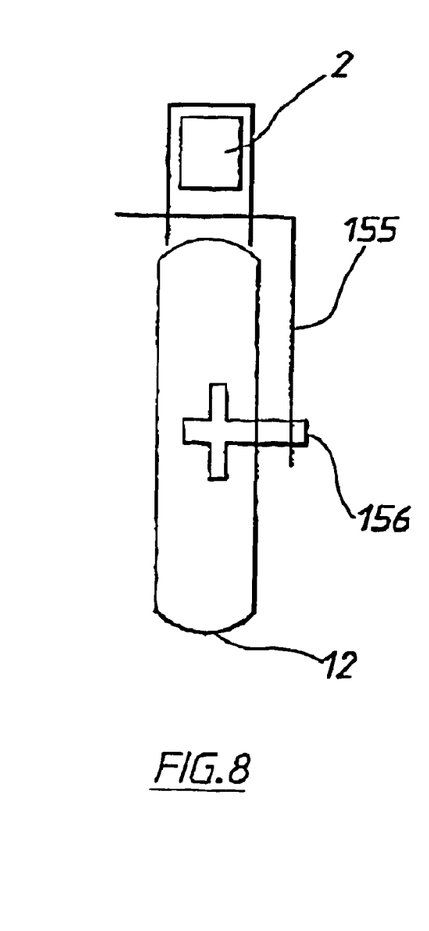
FIG. 8 is a schematic third angle projection of the disc planter of FIG. 5.

The disc planter 100 shown in FIG. 4 differs from that shown in FIGS. 1 to 3 in that the press wheel 12 is no longer mounted to a U-shaped bracket 8 attached to the main beam 2 but rather is attached by means of a U-shaped bracket 80 attached to a secondary beam 82 which is spaced vertically from and above the main beam 2. The U-shaped bracket 80 is attached to the underside of the secondary beam 82 adjacent a first end 83 thereof. The secondary beam 82 is attached, towards the second end 85 thereof, to the main beam 2, by a bar or flat section 84 welded to the main beam 2 at a position between the point of attachment to the main beam 2 of the hydraulic cylinder 24 and the discs 18, 20.

The disc planter 100 of FIG. 4 also differs from that shown in FIGS. 1 to 3 in the means of adjusting the position of the angled arm portions 14 of the second axles 13 supporting the discs 18 and 20 relative to the ground. The disc planter 100 of FIG. 4 comprises a first bar 86 attached to the main beam 2 by means of a pivot pin 87 extending through one of a plurality of apertures 99 in a side face 88 of the main beam 2 at a location between the point of attachment of the secondary beam 82 and the free end 88 of the main beam 2 opposite to the end 6 which is adjacent the bar 3 attached to the seed dispensing apparatus or towing vehicle (not shown). The provision of a plurality of apertures 99 through which the pivot pin 87 may be located enables the position of the discs 18, 20 to be adjusted relative to the main beam 2. A second flat bar 89 is attachable to the first bar 86 adjacent the free end 90 thereof opposite the free end 97 adjacent which the pivot pin 87 is located. A pin 91 is locatable in one of a number of apertures 92 spaced vertically along the second bar 89 and the pin 91 extends through a correspondingly aligned aperture through the first bar 86 to retain the second bar in position relative to and attached to the first bar. This arrangement enables further alteration of the position of the discs 18, 20 relative to the main beam 2.

The disc planter 200 shown in FIGS. 5 to 8 is a further modification of the disc planter 1 shown in FIGS. 1 to 3. It differs therefrom in that there is a single main beam 2 to which the discs 18, 20 and press wheel 12 are attached, thereby reducing the number of constituent components of the disc planter.

The discs 18, 20 of the disc planter 200 of FIGS. 5 to 8 are attached to the main beam 2 by means of an axle 160 comprising a vertically extending portion 161 which depends from and is secured by means of, for example, a U-bolt to the main beam 2. Two arm portions 164 extend outwardly from the vertically extending portion 161 towards the free end 162 thereof. The arm portions 164 are angled downwardly at an angle "B" to the horizontal plane of about 6 to 12 degrees and preferably 8 to 10 degrees. The angled portions 164 of the axle 160 extend through a central aperture in each of the discs 18 and 20.

In contrast to the embodiments shown in FIGS. 1 to 4, the disc angle in the embodiment shown in FIGS. 5 to 8 is fixed and not adjustable.

The disc planter 200 of FIGS. 5 to 8 further differs from those shown in FIGS. 1 to 4 in the manner in which the press wheel is attached to the main beam 2. In this embodiment, an L-shaped section 155 is bolted to the underside 165 of the main beam 2 adjacent the free end 7 thereof which is opposite that attached to the towing vehicle. An axle 156 extends through a central aperture in the press wheel 12 and through a corresponding aperture in the L-shaped section 155 to hold the press wheel 12 in position relative to the main beam 2. The axle 156 may be welded to the L-shaped section 155.

In the embodiment shown in FIGS. 5 to 8, the seed sowing tubes 23 are attached to a plate 201 bolted onto the underside 165 of the main beam 2. The sowing tubes 23 have a spring section 202 along their length to allow for movement.

Figure 12:
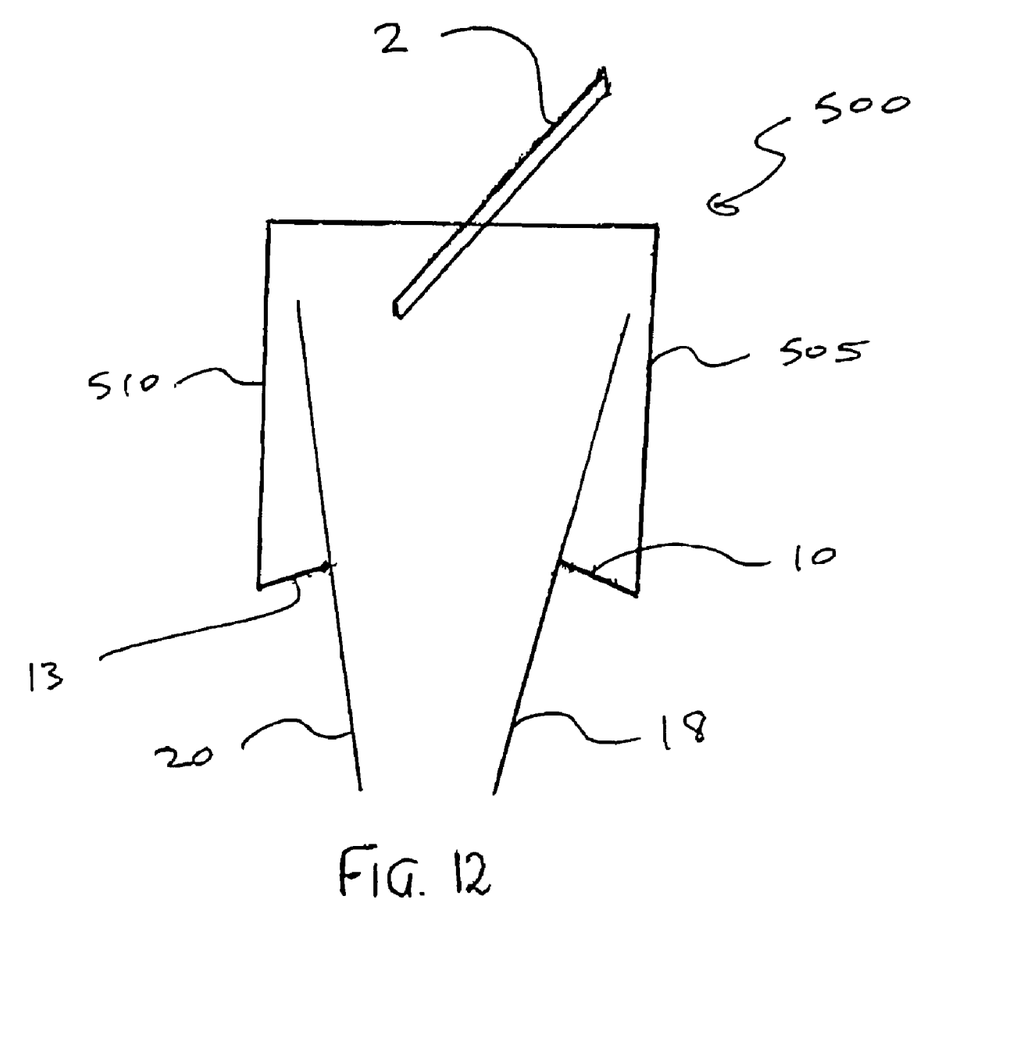
FIG. 12 is a schematic end elevation of an alternate embodiment of the disc planter.
Figure 13:
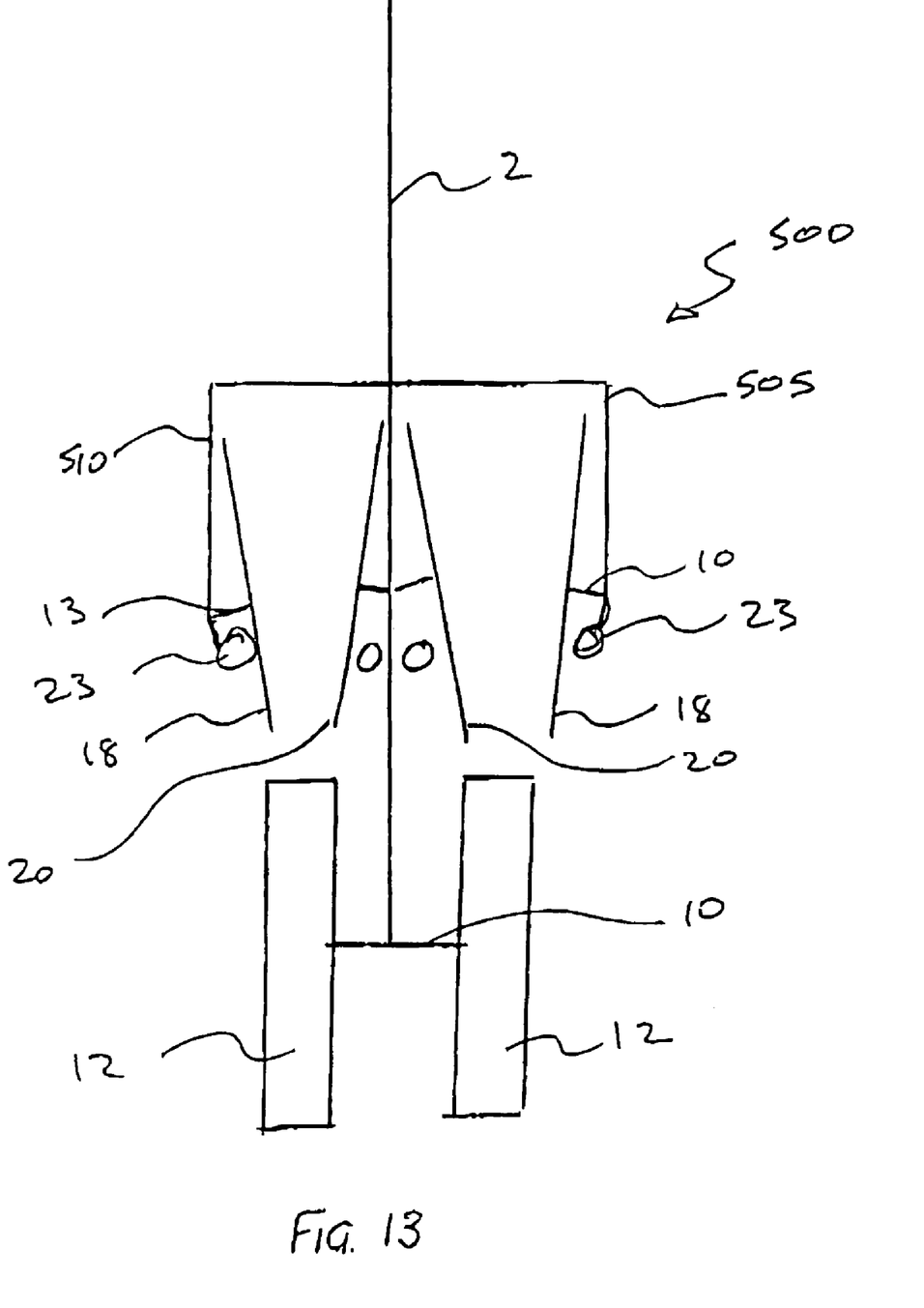
FIG. 13 is a schematic end elevation of two disc planters of FIG. 12 connected together.

The additional advantages of the configuration of disc planter 200 shown in FIGS. 5 to 8 are that the sowing tubes 23, press wheel 12 and discs 18, 20 may be placed anywhere along the main beam 2 allowing for a sowing row spacing of down to around 5 inches (13 cm), which is considerably less than is achievable with conventional disc planters, and advantages also lie in its simplicity of construction and use. Also, the disc planter 200 is fully adjustable and can be easily dismantled for transport. Alternate arrangements are shown in FIGS. 12 and 13 which will be discussed later.

The operation of the disc planters shown in FIGS. 4 to 8 is essentially as described above with respect to the disc planter shown in FIGS. 1 to 3, with the exception of the differences outlined above.

Figure 9:
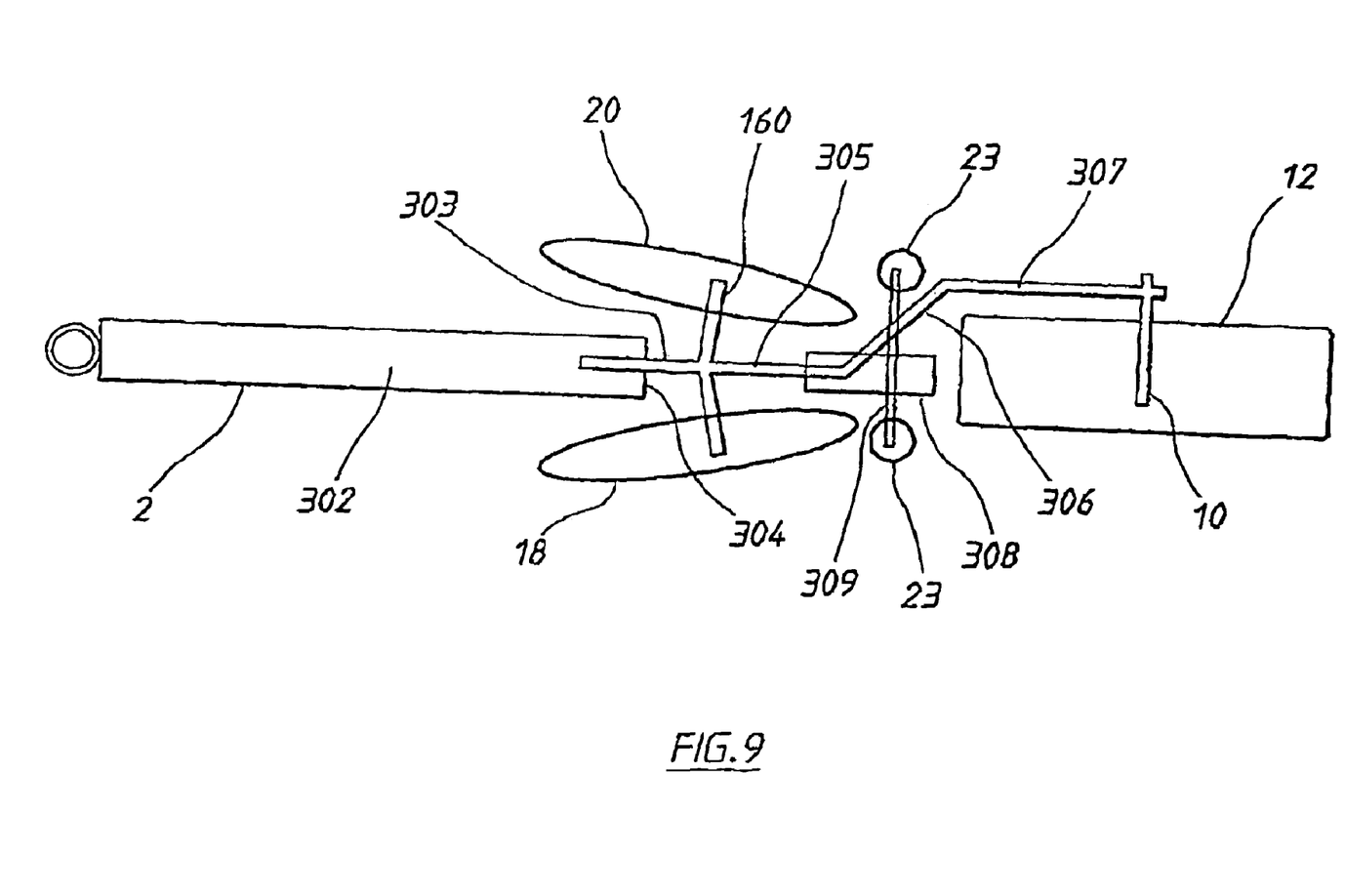
FIG. 9 is a schematic plan view of a further alternative disc planter.
Figure 10:
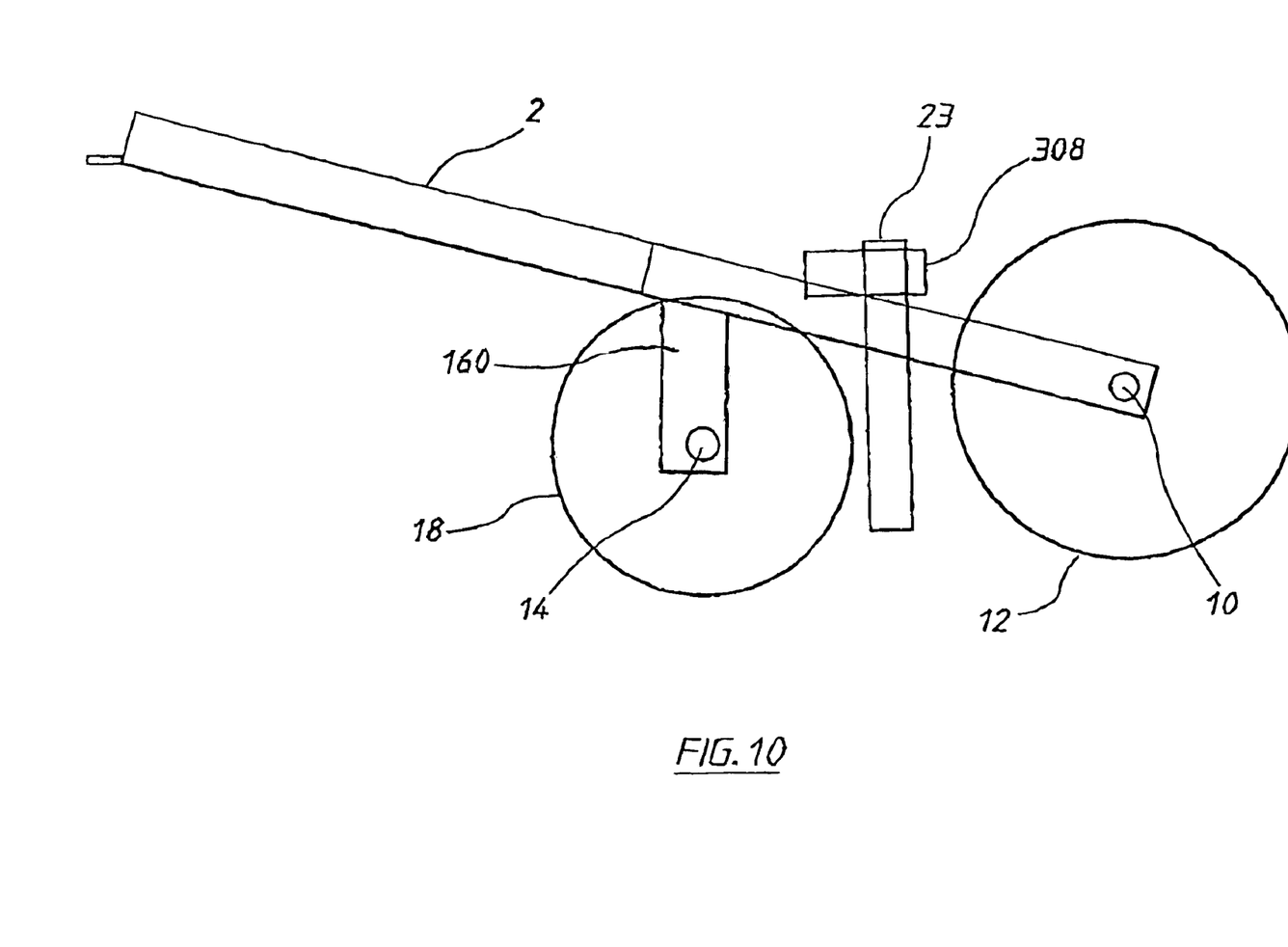
FIG. 10 is a schematic side elevation of a further alternative disc planter.

The disc planters 300 and 400 shown in FIGS. 9 and 10 respectively are further modifications of the disc planter 1 shown in FIGS. 1 to 3.

The disc planter 300 shown in FIG. 9 differs from that shown in FIGS. 1 to 3 in that there is a support member or main beam 2 comprising a first member 302 and a second member 303 welded to the first member 302 adjacent one fee end 304 thereof, the discs 18, 20 and press wheel 12 being attached to the second member 303. In a preferred embodiment, the first member 302 comprises a 3 inch (7.5 cm) beam and the second member 303 comprises a 1 inch (2.5 cm) beam. The second member 303 comprises an integrally formed first section 305, second section 306 and third section 307. The first section 305 is welded to and is substantially parallel to the main beam 2, the second section 306 is angled with respect to the first section 305 and extends between the first section 305 and the third section 207, and the third section 207 is substantially parallel to the first section 305 but is spaced laterally therefrom by the second section 306.

In the embodiment of FIG. 9, the axle 160 on which the discs 18 and 20 are retained is identical to that described above in relation to FIGS. 5 to 8. Furthermore, the press wheel 12 is attached to the third section 307 of the secondary beam 303 in the same manner as the press wheel 12 is attached to the main beam 2 in the embodiment of FIG. 8 as described above.

The disc planter 300 of FIG. 9 further differs from those shown in FIGS. 1 to 4 in the manner in which the seed tubes 23 are attached. In the embodiment of FIG. 9, the seed tubes 23 are attached to the secondary beam 303 around the point of intersection of the first section 305 and the second section 306 by means of a first member 308 to which a second member 309 is attached, for example, by welding, such that the first and second members 308, 309 form a T-shaped section, the first member 308 forming the stem portion and the second member 309 forming the arm portion. The first and second members 308, 309 may formed of flat pieces of metal and the first member 308 may be welded or U-bolted to the secondary beam 303. Each seed tube 23 is welded or secured by means of a U-bolt to respective ends of the second member 309 and extends in a plane substantially perpendicular to the plane of the upper face of the second member 309.

In the disc planter 300 shown in FIG. 9, the secondary beam 303 could be attached to the main beam 2 by being welded to it or it could slot into a channel in the main beam 2, The secondary beam 303 is preferably formed of a 6 inch (15 cm) by one inch (2.5 cm) bar which is bent to form the Z-shaped section illustrated.

The disc planter 400 shown in FIG. 10 differs from that shown in FIGS. 1 to 3 in that the support member 2 comprises a first beam portion 401 and a second beam portion 402 attached thereto, for example by welding. In a preferred embodiment, the first beam portion 401 is a 3 inch (7.5 cm) square beam and the second beam portion 402 is a 1 inch (2.5 cm) square beam. The discs 18 (shown) and 20 (not shown) are attached to the main beam 2 by means of axle 160 of the type and in the manner described above with regard to FIGS. 5 to 8. The press wheel 12 in the embodiment of FIG. 10 is attached to the main beam 2 by means of an axle 10 which extends through and aperture in the main beam 2 adjacent the end of the main beam 2 opposite to that which is attachable to the towing vehicle. The seed tubes 23 in the embodiment of FIG. 10 are attached to the main beam 2 in the same way as the seed tubes 23 described above in relation to the embodiment of FIG. 9, the first member 308 of the T-shaped section being attached to the main beam 2 by means of welding or a U-bolt. The second member 309 of the T-shaped section is not shown in FIG. 10.

The hydraulic cylinder 24 shown in FIGS. 1 to 3 is also to be used in connection with the disc planters 300 and 400 shown in FIGS. 9 and 10 although it is not shown in those figures.

Further embodiments are shown in FIGS. 12 and 13, where the support member or main beam 2 is attached to the discs 18, 20 by way of a frame 500. The frame 500 being generally "n" shaped and having a pair of ends 505, 510 located on opposite longitudinal sides and spaced normal from the main beam 2. The axles 10, 13 extend laterally from the ends 505, 510 and when viewed from the discs 18, 20 converge rearwardly and downwardly.

The operation of the disc planters shown in FIGS. 9, 10, 12 and 13 is essentially as described above with respect to the disc planter shown in FIGS. 1 to 3 and 11, with the exception of the differences outlined above.

Various modifications to the apparatus described will be apparent to those skilled in the art, for example, the hydraulic cylinder 24 described above as being hingedly attached to the towing vehicle may be attached to the bar 3 which is itself attached to the towing vehicle. Also, the hydraulic cylinder 24 used to provide an adjustable downward pressure on the main beam 2 may be replaced by another means of exerting pressure such as pneumatically, or using a spring or a weight. In another preferred embodiment, the second axles 13 may be V-shaped. Also, the U-shaped bracket 8 could be replaced by an L-shaped bracket, the single arm of which could extend adjacent either outer face of the press wheel 12. Whilst the preferred angle of orientation X of the arm portions 14 of the second axles 13 has been described as being between 6° and 12° and preferably 8 to 10°, it is possible that an angle outside this range could be used, In a preferred embodiment, the length of the disc planters 1, 200, 300 and 400 including the main beams 2, frame 500, any first and second members thereof, and the press wheels 12 maybe around 8 feet (2.5 m) from front to back to enable them to fit onto a truck for transportation in the assembled state.

As mentioned above, in use a plurality of disc planters 1, 200, 300 or 400 are attached to the towing vehicle (such as shown in FIGS. 11 and 13) each being spaced laterally from and parallel to one another. In a preferred embodiment (not shown), the plurality of disc planters 1, 200, 300 or 400 may be arranged such that the discs 18, 20 and/or press wheels 12 are laterally staggered with respect to one another in a zig-zag pattern. This may be achieved, for example, by altering the length of adjacent main beams 2 and/or any members of which the main beams 2 may be comprised. As an example, the lengths of adjacent main beams may vary by 3 inches (7.5 cm). This has the advantage that heavier axles may be used to support the discs 18, 20 which are tougher and more durable.

The disc planters 1, 100, 200, 300 and 400 described herein have a number of advantages, in particular, they are very simple mechanisms with a minimum number of moving parts. The provision of one press wheel 12 per two discs 18 and 20, each disc cutting a separate groove in the soil, is in contrast to conventional disc planters which typically have one disc cutting a groove in the soil or a pair of discs cutting a single groove in the soil, and typically one or more press wheels per disc. Furthermore, the disc planter 1 described herein has an easily and fully adjustable disc angle.

Due to the structural configuration of the disc planters 1, 100, 200, 300, and 400 it is possible to achieve a closer spacing between adjacent grooves than is possible with conventional disc planters which leads to improved germination of the seeds sown. The disc planters 1, 100, 200, 300 and 400 are capable of handling large amounts of trash on the ground and it is anticipated that they will be able to operate at speeds of up to around 30 km/hour. As the discs 18 and 20 of disc planter 1 are located one on either side of the central portion 16 of the second axles 13, there is an equal pull exerted on the main beam 2 from opposite sides thereof and the disc planters 1, 100, 200 are therefore able to be towed in a substantially straight line with little or no sideways drift.

It will be appreciated that the variations shown in FIGS. 4 to 10 for example, the means of attaching various components to the main beam 2, or the seed sowing tubes 23 may be incorporated into one or more of the embodiments described.

The invention claimed is:

1. An agricultural plough including:
   a longitudinally extending support member having a forward portion to be attached to a vehicle to thereby enable the apparatus to be towed by the vehicle;
   a generally "n" shaped frame fixed to said support member and including a pair of ends located on opposite longitudinal sides and spaced normal to said support member;
   a pair of axles attached to and extending laterally from said ends and providing a pair of laterally extending rotational axes, the axes being located on opposite sides of the member and in a plane extending transversely normal to said member at an acute angle longitudinally so as to extend rearwardly down, the axes each being inclined by an acute angle of 6 to 12 degrees to a plane extending normal to the member to diverge rearwardly;
   a plough disc supported on each axle to rotate about said rotational axes, with the discs and axles being configured so that the discs converge rearwardly and downwardly, the discs being displaced rearwardly from said forward portion;
   a wheel attached to said support member and rotatable about an axis generally transverse of the support member, the wheel being located rearwardly of said axles; and
   means connected to the support member and to be attached to the vehicle, to urge said member downwardly so that said discs are urged into soil and said wheel is urged into contact with a soil surface rearwardly of the discs so that upon forward movement of the vehicle with the discs engaged in the soil, each disc forms a separate groove and a corresponding ridge in the soil between said grooves, with the ridge being engaged by the wheel to urge the soil to cover seeds located in the grooves.

2. An agricultural plough according to claim 1, wherein the axes are inclined by an acute angle of 8 to 10 degrees.

3. An agricultural plough according to claim 2, wherein said support member comprises a first member and a second member, said second member being attached to said first member.

4. An agricultural plough according to claim 3, wherein said wheel for pressing soil into the grooves is mountable on said second member.

5. An agricultural plough according to claim 1, wherein said support member comprises a first member and a second member, said second member being attached to said first member.

6. An agricultural plough according to claim 5, wherein said wheel for pressing soil into the grooves is mountable on said second member.

7. An agricultural plough according to claim 1, wherein the means for urging the discs into the soil is operable to enable adjustment of the depth of the grooves to be formed.

8. An agricultural plough according to claim 1, wherein the means for urging the discs into the soil comprises a hydraulic cylinder connectable between said vehicle and the support member.

9. An agricultural plough according to claim 1, further comprising an adjustable assembly operatively associated with said axles to adjust the position of the axles relative to said support member and soil.

10. An agricultural plough according to claim 9, further comprising locking means for locking said adjustment assembly in a preselected position, thereby inhibiting movement of the axles relative to the support member.

11. An agricultural plough according to claim 1, wherein the discs are outwardly inclined by an acute angle to a plane extending normal to the member.

* * * * *